April 28, 1964 B. A. SAWYER 3,130,589
ACCELEROMETER TEMPERATURE COMPENSATION TRIMMING APPARATUS
Filed Nov. 18, 1960 2 Sheets-Sheet 1

INVENTOR:
Bruce A. Sawyer
By Alan C. Rose
Attorney.

April 28, 1964  B. A. SAWYER  3,130,589
ACCELEROMETER TEMPERATURE COMPENSATION TRIMMING APPARATUS
Filed Nov. 18, 1960  2 Sheets-Sheet 2

INVENTOR:
Bruce A. Sawyer
By Alan C. Rose
Attorney.

United States Patent Office 3,130,589
Patented Apr. 28, 1964

3,130,589
ACCELEROMETER TEMPERATURE COMPENSATION TRIMMING APPARATUS
Bruce A. Sawyer, Sherman Oaks, Calif., assignor to Litton Systems, Inc., Beverly Hills, Calif., a corporation of Maryland
Filed Nov. 18, 1960, Ser. No. 70,209
8 Claims. (Cl. 73—497)

This invention relates to precision accelerometers, and more particularly to the precise temperature compensation or trimming of accelerometers or related apparatus.

In the precision accelerometer field the accelerometer should be designed to have little or no variations in output signal with temperature. This may be accomplished by an appropriate mechanical arrangement of the accelerometer structure per se. Thus, for example, in my copending patent application Serial No. 814,487, filed May 20, 1959, for a "Miniaturized Temperature Insensitive Accelerometer," now Patent No. 3,078,721, a technique is disclosed wherein the temperature variations relating to the magnetic forces and other factors may be largely compensated by the change in density of the liquid in which the moving portion of the accelerometer is floated.

However, it has been determined that the slight remaining changes in output signal with temperature exceed the stringent limits of certain high precision applications. It is the principal object of the invention, therefore, to further compensate or "trim" the output signal from an accelerometer or similar servo device with changes in temperature.

In accordance with the present invention, this is accomplished by the addition of a resistance having a constant value in shunt with the coil or coils which provide the restoring force in the accelerometer. The fixed value of the resistance is uniquely related to the slope of the temperature variation of the entire accelerometer unit and also the resistance coefficient of the conducting wire of the coils.

It is particularly to be noted that a resistor which has a constant resistance with changes in temperature is employed, instead of the temperature sensitive resistances which are frequently employed to compensate for temperature variations in an associated apparatus. From a physical standpoint, the invention lies in the recognition that the linear resistance change of the coil with temperature may be employed indirectly to compensate for an opposed linear change in the output current of the accelerometer system with changes in temperature. And this is true despite the fact that the current through the coil is not directly dependent on the resistance of the coil but is supplied by a servo system at the level necessary for rebalancing the accelerometer. However, the shunt resistance, which is essentially constant, provides a current increment which is dependent on the resistance of the coil; thus, by utilizing an accelerometer having a negative temperature coefficient, the positive coefficient of resistance of the torquer coil produces a current in the shunting resistance which has a positive coefficient, thereby providing a total current output from the torquer coil and the shunt resistance which is constant with changes in temperature.

In the foregoing discussion, it is assumed, of course, that constant acceleration conditions are under consideration. In addition, it is assumed that the torquer coil employed to produce restoring forces, is formed of copper or some other material having a positive temperature coefficient of resistance. In the case of an accelerometer structure having a positive temperature coefficient, the present compensation scheme could be employed through the use of a torquer coil made of one of the less common materials having a negative temperature coefficient of resistance. As a practical matter, however, the accelerometer structure should normally be constructed to have a slight negative coefficient throughout the temperature range of interest so that a conventional copper torquer coil may be employed. With this arrangemnet, a simple compensating shunt resistance of the proper fixed value, as set forth below in the present specification, may be employed.

Other objects, features and advantages of the invention will become apparent from a consideration of the following detailed description and from the associated drawings in which.

Figure 3:
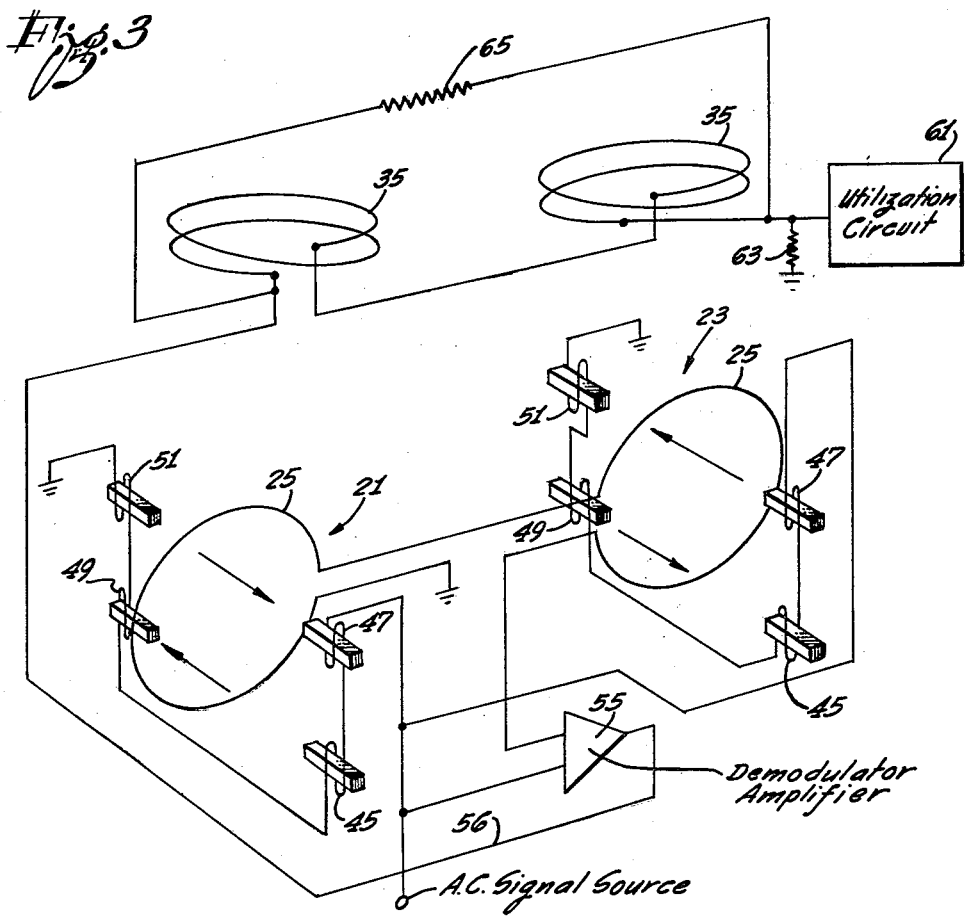
FIG. 3 is a diagrammatic circuit drawing of the electrical system of the accelerometer system in accordance with the present invention.
Figure 4:
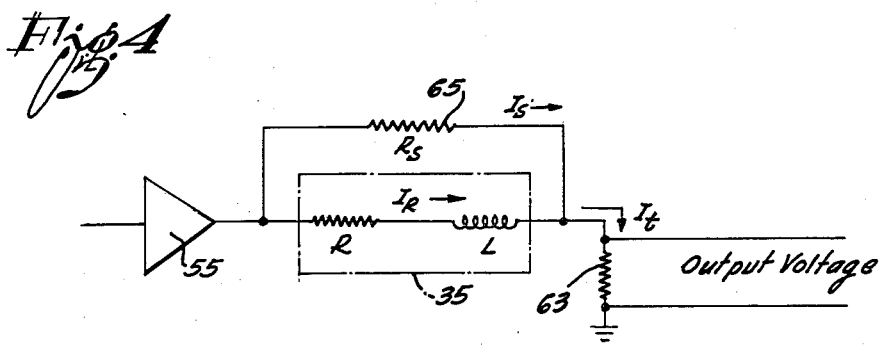
FIG. 4 is a simplified circuit diagram employed in the analysis of the present invention.

Referring to the drawings, the present invention principally involves the addition of compensating circuitry to accelerometer apparatus which is generally known. The circuits in accordance with the invention, by which the additional "trimming" temperature compensation is accomplished, are shown in FIGS. 3 and 4. However, for completeness, it is considered appropriate to show the physical construction of one typical accelerometer arrangement. This physical construction will now be considered in connection with FIGS. 1 and 2 of the drawings.

Figure 1:
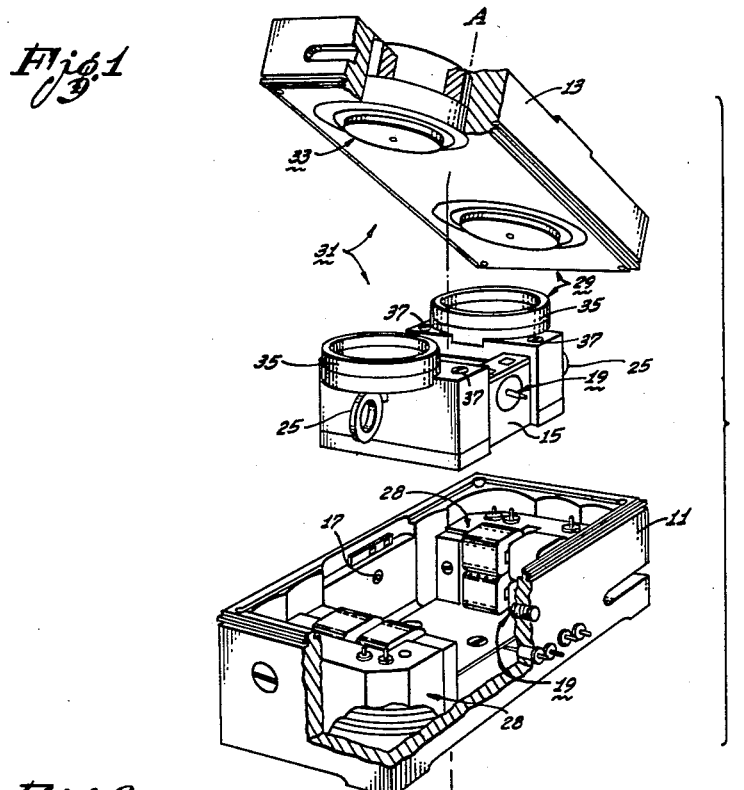
FIG. 1 is an exploded isometric view of a precision accelerometer.
Figure 2:
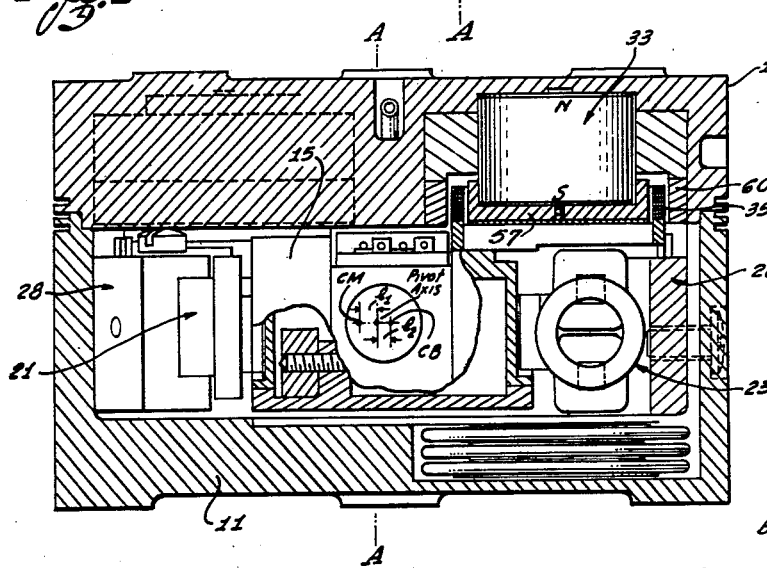
FIG. 2 is a side-view in partial cross-section of the accelerometer of FIG. 1.

As shown in FIGS. 1 and 2, the accelerometer may include: an outer housing 11 having a cover assembly 13; a pendulum unit generally designated 15 which is floated within housing unit 11 and which is rotatably mounted within the outer housing; a pair of jewel-and-pivot bearings 17 and 19 for rotatably mounting the pendulum unit to the outer case 11; a pair of pick-off signal generators 21 and 23, each pick-off signal generator including a pick-off coil 25 coupled to pendulum unit 15 and an exciter coil assembly 28 rigidly mounted within housing 11; and a pendulum torquer including a pair of forcing units generally designated 29 and 31, each forcing unit including a torquer magnet 33 positioned on cover assembly 13 and a torquer coil 35 mounted on pendulum unit 15 in such manner that they are in registry with one another when the accelerometer is assembled.

The pendulum unit 15 is responsive to accelerations applied along a sensitive axis, indicated in FIG. 1 by a line A—A. Accelerations applied to the unit along this axis A—A rotate the pendulum unit from its null position about its pivot axis defined by bearings 17 and 19, thereby generating an error signal through the interaction of pick-off signal generators 21 and 23 and the movable coils 25. As discussed below, the error signal is amplified and demodulated and is applied to torquer coils 35 of forcing units 29 and 31. The signal applied to the torquer coils is responsive to the error signal and is increased to the proper magnitude for restoring the pendulum unit substantially to its null position.

As noted above, FIG. 2 is a partially sectionalized side elevation view of the accelerometer. In FIG. 2, the center of mass CM and the center of buoyance CB are shown located with respect to the pivot axis of the accelerometer. The pendulum unit is so constructed that a line intersecting the pivot axis and drawn between the center of mass CM and the center of buoyance CB is mutually orthogonal with respect to the sensitive axis A—A and the pivot axis, which is defined by the bearings 17 and 19. As a result of this structural arrangement, the accelerometer is not sensitive to cross-coupling which normally occurs as a result of flotation fluid density changes due to variations in the temperature of the fluid. For example, when the temperature of the flotation fluid is at the prescribed normal operating temperature, the pendulum unit mass is substantially equal to the mass of the displaced fluid, or in other words, the pendulum unit is in neutral buoyancy. If, now, the density of the flotation fluid changes due to a temperature variation from the prescribed temperature, a small net difference will exist between the pendulum unit mass and the displaced fluid mass. Thus, if the axis of rotation, or the pivot axis, fails to intersect the line joining the centers of mass and buoyancy, then the force developed due to orthogonal accelerations tends to rotate the sensitive axis of the accelerometer by an amount proportional to the temperature difference for neutral buoyancy, thereby introducing inaccuracies in the accelerometer operation.

As shown in FIG. 1, in order to insure that the pivot axis is not displaced from the line joining the center of mass and center of buoyancy and to locate the pivot axis along this line at a predetermined point to be hereinafter defined, a set of four trimming screws 37 are provided on the pendulum unit. It is clear that the center of mass of the pendulum unit can be translated by a small amount along the line joining the center of mass and center of buoyancy by trimming small amounts from one or more of the screws. In addition, each of the screws can be moved in and out of its threaded hole thereby shifting the center of mass and the center of buoyancy in a direction parallel to the sensitive axis. Thus, minor inaccuracies in the mass distribution and configuration of the pendulum unit in manufacture can be easily compensated for during final assembly and adjustment of the accelerometer by use of the four trimming screws.

Now, considering the temperature dependency on a more quantitative basis, the principal factors which are involved include reversible metallurgical changes within the magnet 33 which cause a reduction in magnetic field strength and an expansion of the flotation fluid, with increasing temperature. As the output of the unit is measured by the current through the torquer coils, these factors must be examined from the standpoint of their effect on this current.

As the temperature is increased, the resultant decrease in magnetic field strength means that a greater current to the torquer coils 35 is required to produce the same restoring force. When the density of the displaced fluid differs from that of the pendulum as a result of temperature changes, a net torque is produced. The torque is equal to the net positive or negative buoyant force acting over an effective "lever arm" equal to the distance between the pivot axis and the center of buoyancy of the pendulum.

With regard to a particular example, let us consider the effect of the acceleration of gravity acting on the device of FIG. 2 positioned with the sensitive direction A—A vertical as shown in this figure of the drawing. The acceleration of gravity tends to produce a counterclockwise torque, in view of the location of the center of mass CM of the pendulum to the left of the pivot axis. Now, as the temperature increases, it has been shown above that the current through coil 35 would normally be increased in view of the reduction in magnetic field strength associated with magnet 33. It would be desirable, therefore, to reduce the force required by the torquer coils and thus reduce the amount of current which must be forced through the torquer coils by the servo-system, as the temperature increases. When the temperature is increased, the fluid expands and the pendulum is then slightly more dense than the fluid. This provides a downwardly acting force on the center of buoyancy CB which is located to the right of the pivot axis as seen in FIG. 2. This clockwise force will tend to counteract the counterclockwise force produced by the acceleration of gravity, thus reducing the amount of the rebalancing force which must be supplied by the torquer coils 35. In the foregoing example, the acceleration of gravity has been considered. However, the same considerations obviously apply for accelerations other than gravity having a component along the sensitive axis A—A of the accelerometer. This type of accelerometer is insensitive to components of acceleration acting normal to the sensitive axis A—A. Thus, the explanation would be the same if the case 11 of FIG. 2 were rotated exactly 90° in a counterclockwise direction and subjected to an acceleration to the left.

As explained in detail in my copending patent application Serial No. 814,487, cited above, the required relationship between the various factors discussed above are given by the following equation:

$$l_1 = \frac{r}{s}(l_1 + l_2) \qquad (1)$$

wherein: $l_1 + l_2$ represents the distance between the center of buoyancy and the center of mass along the line joining the two centers, $l_2$ is the distance between the center of buoyancy and the point of intersection of the line which joins the center of mass and buoyancy with the sensitive axis and the pivot axis, $s$ is the volume temperature coefficient of expansion of the flotation fluid, and $r$ is the coefficient of change in the magnitude of the torquer coil current with temperature which results principally from the changes in the properties of the torquer magnetic assembly.

When the foregoing expression (1) is satisfied, the assembly is compensated to the degree which is possible by adjusting these parameters. For the purposes of the present invention, however, the total temperature coefficient of the accelerometer unit should be negative; accordingly, the negative factor produced by the expansion of the flotation fluid should predominate over the positive factor as represented by the changes of the magnetic material. The distance $l_2$ should therefore be slightly greater than that indicated by Equation 1 or, stated in another way, the distance $l_2$ should never be less than that indicated by the formula.

Before departing from FIG. 2, it is interesting to note that the torquer coil arrangement is similar to the polarized magnet and moving coil arrangement which is used in loud-speakers; thus, the moving coil 35 is mounted within the gap provided by the inner pole pieces 57 and the outer pole piece 60 which complete the magnetic path through the permanent magnet 33 casing 13 which is also of magnetic material. When direct current signals of one polarity are passed through the coil, the torquer coil structure 35, it tends to move in one direction through the gap, and an opposite force is produced when the direct current is reversed in polarity.

With reference to FIG. 3, the pick-off signal generator coils 45, 47, and 49, 51 provide a magnetic flux which passes through the movable coil 25 in such manner as to cancel out when the pendulum is precisely centered at its null position. When the pendulum rotates as a result of an input acceleration, one of the coils 25 will be moved in one direction and the other coil 25 will be moved in the opposite direction, about the central pivot axis. Under these circumstances, a net alternating current signal will be picked up by the coils 25 and applied to circuit 55. The servo loop is completed by the output lead 56 which interconnects the demodulator and amplifier 55 with the coils 35. Lead 56 supplies direct current to the torquer coils 35 at a level sufficient to restore the pendulum to its null position. The magnitude of the restoring current is measured by the utilization circuit 61 which is connected across the output resistor 63. The utilization circuit 61 may include, in addition to a measuring circuit, a guidance computer and other desired apparatus.

The resistor 65 is connected in shunt with the torquer coils 35 to provide a trimming temperature compensation for the complete accelerometer unit. In accordance with an important feature of the invention, it has been determined that, when an accelerometer is constructed to have a slight negative coefficient of current and the torquer coils 35 have a positive temperature coefficient of resistance, the resistor 65 may provide proper first order trimming action when it is a fixed resistance.

The value of the trimming resistor 65 may be calculated through the analysis of the simple circuit of FIG. 4. In FIG. 4 the servo amplifier 55 supplies signals both to the torquer coil 35 which includes a resistive component R and an inductive component L, and to the shunt compensating resistor 65, which is also designated $R_s$. The output voltage to the measuring circuit is developed across resistor 63.

To determine the proper value of the shunt resistance $R_s$, it is useful to consider the current through the torquer coils 25 in the absence of the shunt resistor $R_s$. Under these conditions, the following equations hold:

$$I_R = I_o(1 - a\Delta T) \qquad (2)$$
$$I_t = I_R \qquad (3)$$

wherein:

$I_t$ is the total current flowing to the output resistor 63,
$I_R$ is the current flowing through coils 35.
$\Delta T$ is the change in temperature,
$a$ is the temperature coefficient of the accelerometer, and
$I_o$ is the current at the reference temperature from which the change in temperature $\Delta T$ is measured.

When the shunt resistor $R_s$ is added to the circuit, $I_t$ is no longer equal to $I_R$ and the following relationships obtain:

$$I_t = I_s + I_R \qquad (4)$$

where $I_s$ is the shunt resistance of resistor 65.

$$R = R_o(1 + b\Delta T) \qquad (5)$$

where

R is the resistance of coil 35,
$R_o$ is the resistance of coil 35 at the reference temperature, and
$b$ is the temperature coefficient of resistance of coil 35.

As noted above, the current through the torquer coils is still given by Equation 2, as the servo system supplies current to the torquer coils until rebalancing occurs.

Now, substituting in Equation 4, the following derivation may be performed:

$$I_t = I_R + I_R \frac{R}{R_s} = I_R \left(1 + \frac{R}{R_s}\right) \qquad (6)$$

since:

$$I_s R_s = I_R R \qquad (7)$$

$$\frac{I_t}{I_o} = (1 - a\Delta T) + \frac{R_o}{R_s}(1 - a\Delta T + b\Delta T - ab\Delta T^2) \qquad (8)$$

$$\frac{I_t}{I_o} = 1 + \frac{R_o}{R_s} + \left[\frac{R_o}{R_s}(b-a) - a\right]\Delta T - \frac{R_o}{R_s} ab\Delta T^2 \qquad (9)$$

$$\left[\frac{R_o}{R_s}(b-a) - a\right]\Delta T = 0 \qquad (10)$$

Now, for cases where $\Delta T$ is small, the $ab\Delta T^2$ term can be neglected. Then, for $$\frac{I_t}{I_o}$$

to be independent of temperature, the following relationship should obtain:

$$R_s = R_o\left(\frac{b}{a} - 1\right) \qquad (11)$$

Thus, there is a unique relationship between torquer coil resistance, shunt resistance, accelerometer temperature coefficient, and torquer coil resistance coefficient, which will give a resultant current that is independent of temperature. In practice, measurements are made upon the completed accelerometer unit without the shunt resistor at two different temperatures, with a constant accelerating force being employed in both cases. From this data, the required value of the trimming resistor may readily be computed.

It can also readily be shown that the value of resistors 65, $R_s$, must be at least one-half of the value given in Equation 11. A value of $R_s$ equal to one-half the value specified in Equation 11 produces an accelerometer having a temperature coefficient equal to $+a$ as contrasted with the coefficient of $-a$ which appears in Equation 2. Accordingly, the resistance 65 must be at least equal to the value of $$\frac{R_o}{2}\left(\frac{b}{a} - 1\right)$$

to improve the characteristics of the accelerometer, and will provide some improvement for all greater values of resistance up to infinity. Within this range, the resistance will provide optimum compensation when it has precisely the value shown in Equation 11. Further reductions in the value of $R_s$ from the value set forth in this paragraph would provide a unit having a greater positive temperature coefficient than the original negative coefficient.

While the present invention does not require much change from prior art accelerometer arrangements, it provides compensation which reduces the temperature sensitivity of the apparatus to a negligible level. Furthermore, it is important to note that the required additional resistor is of essentially constant resistance with changing temperature and that it must be accurately matched to the composite characteristics of the accelerometer and the torquer coil temperature characteristics. It is further noted that the accelerometer itself must have a slight negative temperature coefficient in order to permit compensation by the present method, when an ordinary copper torquer coil is employed.

The surprising result of using a constant resistor for temperature compensation resulted from the recognition that the linear resistance change of the torquer coil could be employed indirectly to provide a variation in the fixed associated resistor. Furthermore, the compensating resistor need not be within the accelerometer structure but may be spaced from it, and at a different temperature.

For other details of the accelerometer physical structure, reference is made to my copending patent application cited above.

It is to be understood that the above-described arrangements are illustrative of the appliction of the principles of the invention. Numerous other arrangements may be devised by those skilled in the art without departing from the spirit and scope of the invention. Thus, by way of example, and not of limitation, the accelerometer may be of the "force-balance" or of other types in which linear rather than rotational forces are employed. Accordingly, it is to be understood that the present invention is only to be limited by the spirit and scope of the appended claims.

I claim:

1. In an accelerometer system, a pivoted pendulum member, a torquer coil for restoring said pendulum to a null position when driven from the the null position by applied acceleration, means for supporting said pendulum in a liquid to produce a torquer coil current function having a slight negative coefficient as given by the following expression, $$I_R = I_o(1 - a\Delta T)$$

where $I_R$ is the torquer coil current, $I_o$ is the current at a given temperature, $a$ is the temperature coefficient of the accelerometer without resistance compensation, and $\Delta T$ is the change in temperature; said accelerometer torquer coil having the following resistance characteristic:

$$R = R_o(1 + b\Delta T)$$

where $R_o$ is the resistance at a predetermined temperature at which the current $I_o$ was measured and where $b$ is the temperature coefficient at resistance of the coil; and a substantially constant resistance connected across said torquer coil, said resistance having a value substantially equal to $$\left(\frac{b}{a}-1\right)R_o$$

2. In a temperature compensated rebalancing servo-system, means for providing an input signal, means including a relatively movable electrical coil and armature for providing a force which corresponds in magnitude to said input signal, means for providing a current through said coil which has a negative temperature coefficient for any given input signal, a measuring circuit connected to said coil, and a temperature stable resistance connected in shunt with said coil for increasing the total current supplied to said measuring circuit as the resistance of the coil increases, said resistance having a value selected so as to compensate for said negative temperature coefficient.

3. In an accelerometer system, an accelerometer having a restoring coil current given by the following formula:

$$I_R = I_0(1 - a\Delta T)$$

where $I_0$ is the current at a predetermined temperature, $a$ is the temperature coefficient of the accelerometer without resistance compensation, and $\Delta T$ is the change in temperature; said coil having the following resistance characteristic:

$$R = R_0(1 + b\Delta T)$$

where $R_0$ is the resistance at the predetermined temperature at which the current $I_0$ was measured, and where $b$ is the temperature coefficient of resistance of the coil; and a substantially constant resistance connected across said coil, said resistance having a value substantially equal to:

$$\left(\frac{b}{a}-1\right)R_o$$

4. In a temperature compensated rebalancing servo-system, means for providing an input force, means including an electromagnetic transducer having a coil for providing a force which is equal and opposed to said input force, means for providing a current through said coil which has a normal negative temperature coefficient for any given input force, a measuring circuit connected to said coil, and a temperature stable resistance connected in shunt with said coil for increasing the total current supplied to said measuring circuit as the resistance of the coil increases, said resistance having a value selected so as to compensate for said normal negative temperature coefficient.

5. In an accelerometer apparatus, a pendulum, torquer coil means for restoring said pendulum to its null position when driven from its null position by an applied acceleration, measuring circuitry connected to said torquer coil, means for mechanically adjusting said accelerometer to provide a slight negative temperature coefficient which results in a current to said torquer coil which decreases slightly with increasing temperature over the operating temperature range, and a temperature stable resistance connected in shunt with said torquer coil for increasing the total current supplied to said measuring circuitry as the resistance of the torquer coil increases, said resistance having a value selected so as to compensate for the negative temperature coefficient of the accelerometer.

6. In a temperature compensated rebalancing servo-system, means for providing an input force, means including a relatively movable electrical coil and magnetic structure for providing a force which is equal and opposed to said input force, means for providing a current through said coil which has a normal negative temperature coefficient for any given input force, an output circuit connected to said coil, and a temperature stable resistance connected in shunt with said coil for increasing the total current supplied to said output circuit as the resistance of the coil increases, said resistance having a value selected so as to compensate for said normal negative temperature coefficient.

7. In a temperature compensated rebalancing servo-system, means for providing an input force, means including an electromagnetic transducer having a coil for providing a force which is equal and opposed to said input force, said coil having a temperature coefficient of resistance of one polarity, means for providing a current through said coil which has a normal temperature coefficient of the other polarity for any given input force, a measuring circuit connected to said coil, and a temperature stable resistance connected in shunt with said coil for supplying different amounts of current to said measuring circuit as the resistance of the coil changes, said resistance having a value selected so as to compensate for said normal temperature coefficient.

8. In an accelerometer system, an accelerometer having a restoring coil current given by the following formula:

$$I_R = I_0(1 - a\Delta T)$$

where $I_0$ is the current at a predetermined temperature, $a$ is the temperature coefficient of the accelerometer without resistance compensation, and $\Delta T$ is the change in temperature; said coil having the following resistance characteristic:

$$R + R_0(1 + b\Delta T)$$

where $R_0$ is the resistance at the predetermined temperature at which the current $I_0$ was measured, and where $b$ is the temperature coefficient of resistance of the coil; and a substantially constant resistance connected across said coil, said resistance having a value at least as great as:

$$\frac{R_o}{2}\left(\frac{b}{a}-1\right)$$

References Cited in the file of this patent

UNITED STATES PATENTS

| | | |
|---|---|---|
| 2,618,776 | Wiancko | Nov. 18, 1952 |
| 2,945,379 | Barnes | July 19, 1960 |
| 2,950,430 | Katz | Aug. 23, 1960 |